US 12,092,856 B2

(12) United States Patent
Van Bommel

(10) Patent No.: US 12,092,856 B2
(45) Date of Patent: Sep. 17, 2024

(54) LIGHTING DEVICE

(71) Applicant: SIGNIFY HOLDING B.V., Eindhoven (NL)

(72) Inventor: Ties Van Bommel, Horst (NL)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 18/030,115

(22) PCT Filed: Sep. 30, 2021

(86) PCT No.: PCT/EP2021/076961
§ 371 (c)(1),
(2) Date: Apr. 4, 2023

(87) PCT Pub. No.: WO2022/073846
PCT Pub. Date: Apr. 14, 2022

(65) Prior Publication Data
US 2024/0019626 A1 Jan. 18, 2024

(30) Foreign Application Priority Data
Oct. 5, 2020 (EP) ..................... 20199989

(51) Int. Cl.
F21V 8/00 (2006.01)
(52) U.S. Cl.
CPC ......... *G02B 6/0068* (2013.01); *G02B 6/0028* (2013.01); *G02B 6/0031* (2013.01)
(58) Field of Classification Search
CPC ... G02B 6/0068; G02B 6/0028; G02B 6/0031
See application file for complete search history.

(56) References Cited

U.S. PATENT DOCUMENTS

| 2016/0000951 | A1 | 1/2016 | Kreiner et al. |
| 2016/0033714 | A1* | 2/2016 | Liu .......................... A61L 2/10 362/97.1 |
| 2016/0077292 | A1 | 3/2016 | Dobrinsky et al. |
| 2017/0097466 | A1 | 4/2017 | Dobrinsky et al. |
| 2017/0368212 | A1 | 12/2017 | Fewkes et al. |
| 2018/0180226 | A1 | 6/2018 | Van Bommel et al. |
| 2018/0193504 | A1 | 7/2018 | Kreiner et al. |
| 2019/0091358 | A1 | 3/2019 | Liao et al. |

FOREIGN PATENT DOCUMENTS

| CN | 1971320 B | 6/2012 | |
| EP | 1791010 A2 * | 5/2007 | ........... G02B 6/0021 |

* cited by examiner

*Primary Examiner* — Mary Ellen Bowman

(57) ABSTRACT

The present invention relates to a lighting device (10), comprising: a plurality of first light sources (24) adapted to emit visible light (24); a light guide panel (12), wherein visible light emitted by the plurality of first light sources in operation is coupled into the light guide panel via a light incoupling part (16a); at least one second light source (28) adapted to emit at least one of UV light (28') and violet light to be coupled into the light guide panel via a light incoupling part (16a; 16b); and an optical element (30; 30'; 30"; 42) made of a first material which is different and more UV resistant than a second material that the light guide panel is made of, wherein the optical element is adapted to distribute light emitted by the at least one second light source over an area (34; 46) which is larger than a total light output surface area (35) of the at least one second light source before the light is coupled into the light guide plate.

11 Claims, 6 Drawing Sheets

LIGHTING DEVICE

CROSS-REFERENCE TO PRIOR APPLICATIONS

This application is the U.S. National Phase application under 35 U.S.C. § 371 of International Application No. PCT/EP2021/076961, filed on Sep. 30, 2021, which claims the benefit of European Patent Application No. 20199989.3, filed on Oct. 5, 2020. These applications are hereby incorporated by reference herein.

FIELD OF THE INVENTION

The present invention relates to a lighting device, in particular a UV (ultraviolet) light emitting lighting device with a light guide panel. The present invention also relates to a luminaire or lamp comprising such a lighting device.

BACKGROUND OF THE INVENTION

Although standard LED lighting is a rather mature technology, there are some new trends. A first trend is the increased use of light guide panels (LGP) in the market e.g. in ceiling luminaires for general lighting.

A second trend is the addition of UV LEDs to luminaires for applications such as disinfection (UV-C), vitamin D (UV-B), and crispy white light (UV-A/Violet).

US2018193504 discloses a device for providing intelligent sterilization services. The device includes various LEDs positioned along the edges of a display screen. In other words, the device comprises an edge-lit LED display. The display screen includes a light guide, for directing light emitted by the LEDs in a direction perpendicular to the display screen, a diffuser, a thin-film transistor (TFT) liquid-crystal display (LCD), and other components. At least one of the LEDs comprises a UV LED emitting UV light.

However, a problem with the device of US2018193504 is that it could have a limited lifetime.

SUMMARY OF THE INVENTION

It is an object of the present invention to overcome this problem, and to provide a lighting device in which a light guide panel has improved lifetime.

According to a first aspect of the invention, this and other objects are achieved by a lighting device, comprising: a plurality of first light sources adapted to emit visible light, for instance white light; a light guide panel comprising at least one light incoupling part and a light outcoupling surface, wherein the lighting device is arranged such that the visible light emitted by the plurality of first light sources in operation is coupled into the light guide panel via a light incoupling part of said at least one light incoupling part, wherein at least part of the visible light that is coupled into the light guide panel is guided (via total internal reflection) by the light guide panel, and wherein at least part of the visible light that is guided by the light guide panel is coupled out of the light guide panel at/via the light outcoupling surface; at least one second light source adapted to emit at least one of UV light and violet light to be coupled into the light guide panel via a light incoupling part of said at least one light incoupling part; and an optical element made of a first material which is different and more UV resistant than a second material that the light guide panel is made of, wherein the optical element is adapted to distribute light emitted by the at least one second light source over an area which is larger than a total light output surface area of the at least one second light source before the light is coupled into the light guide plate.

The at least light incoupling part may for example be at least one edge of the light guide panel.

The optical element may be adapted to distribute light emitted by the at least one second light source over an area which is at least 4 times larger, more preferably at least 8 times larger, most preferably at least 10 times larger, than the total light output surface area of the at least one second light source before the light is coupled into the light guide plate.

The present invention is based on the understanding that by providing an(other) optical element made of a more UV resistant material than the light guide panel, which optical element in operation distributes the UV/violet light source a large(r) area before it is coupled into the light guide panel (rather than the UV/violet light being directly coupled into the light guide panel), local material degradation (e.g. browning) of the light guide panel (which may be made by polymer) may be prevented, whereby the lifetime of the present lighting device may be improved. Furthermore, since the material of the optical element is more UV resistant than that of the light guide panel, local material degradation such as browning is not an issue even if the at least one UV/violet light source is placed close to the optical element.

In at least some embodiments, the at least one second light source may be positioned further from its light incoupling part than the plurality of first light sources are positioned from their light incoupling part. By placing the UV/violet light source(s) further from its light incoupling part of the light guide panel than the plurality of visible light sources, the local UV/violet intensity on the light guide panel may be lowered while the visible light sources still can be closely positioned to their light incoupling part, whereby local material degradation of the light guide panel may be prevented, which in turn means that the lifetime of the light guide panel may be improved. It should be noted that in US2018193504 FIG. 2a, all LEDs are positioned are positioned at the same distance from the display screen.

A nearest distance d2 from the at least one second light source to its light incoupling part may be at least two or three times greater than a nearest distance d1 from the plurality of first light sources to their light incoupling part.

In a at least one embodiment, the optical element comprises a second light incoupling part and a second light outcoupling surface, wherein the lighting device is arranged such that light emitted by the at least one second light source in operation is coupled into the optical element via the second light incoupling part, wherein at least part of the light that is coupled into the optical element is guided by the optical element, wherein at least part of the light that is guided by the optical element is coupled out of the optical element at the second light outcoupling surface, and wherein at least part of the light that is coupled out of the optical element at the second light outcoupling surface is coupled into the light guide panel. By means of such an optical element, the UV/violet light may easily be distributed well over the larger (surface) area (corresponding to the second light outcoupling surface) before the UV/violet light is coupled into the light guide panel, without making the lighting device unduly large.

The optical element, which preferably is elongated and thin, may for example be a second light guide. Alternatively, the optical element could be a TIR (total internal reflection) collimator, an optical spacer, etc.

The optical element may extend along an edge or edge portion of the light guide panel. The edge or edge portion may form the aforementioned the light incoupling part for the at least one second light source. Preferably, the optical element extends along (substantially) the complete length of one or more edges of the light guide panel. This may ensure that the UV/violet light is distributed over a large enough (surface) area before the UV/violet light is coupled into the light guide panel.

In a variant, the plurality of first light sources light may be arranged along a different edge or edge portion of the light guide panel than said optical element, which different edge or edge portion may form the light incoupling part for the plurality of first light sources. For example, for a square or rectangular light guide panel, the visible light sources light may be arranged along (preferably the complete length of) one edge of the light guide panel, whereas the optical element may extend along the adjoining edge of the light guide panel. The at least one second light source may here be a single second light source positioned at a short(er) end of the optical element, or a plurality of second light sources distributed along a long(er) side of the optical element. In the former case, the second light source could conveniently be mounted on the same (LED) strip substrate as the plurality of first light sources.

In another variant, the plurality of first light sources may be arranged along the same edge or edge portion of the light guide panel as said optical element.

In another embodiment, the optical element is a reflector at least partly defining a space in operation acting as a mixing chamber for light emitted by the at least one second light source before light from the mixing chamber is coupled into the light guide panel. By means of such a reflector, the UV/violet light may be distributed over a larger area (corresponding to a light exit window of the mixing chamber) before the UV/violet light is coupled into the light guide panel, without making the lighting device unduly large. The reflector may for example be made of (UV resistant) metal or alloy. The mixing chamber may have a wall with a highly reflective inner surface. The reflector may extend along an edge or edge portion of the light guide panel, preferably along (substantially) the complete length of one or more edges of the light guide panel, whereas the plurality of first light sources light may be arranged along a different edge or edge portion of the light guide panel.

The lighting device may further comprise a frame surrounding the light guide panel, wherein the aforementioned optical element is arranged in the frame, the frame shielding the plurality of first light sources, the at least one second light source, and the optical element. In this way, the optical element is not visible from the outside when someone is observing the lighting device, which in turn provides for improved (or at least not worsened) aesthetics of the lighting device. The frame may also shield other components of the lighting device, such as electronics, a heatsink, etc.

In another embodiment, part of a frame surrounding the light guide panel may conveniently form (or at least hold) the aforementioned reflector.

Instead of being arranged in a frame, the optical element could be embedded in the light guide panel or integrated with the light guide panel or arranged behind the light guide panel or arranged in front of the light guide panel. The optical element may for example be arranged as an optical fiber, running through a hole in the light guide panel. The optical fiber may be a "leaky" optical fiber, with a cladding next to a core, wherein there is a refractive index mismatch. Namely, the cladding may have a lower refraction index than the core.

The first material (of said optical element) may be an organic material. The first material may for example be selected from the group comprising: glass, UV fused silica, high purity silica, and silicone.

The light guide panel can be made of an organic polymer, such as PMMA, PC, PET, PS, etc.

The light guide panel may be arranged between a light guide panel reflector and a diffuser of the lighting device. The diffuser may be positioned in front of a first major surface of the light guide panel, and the light guide panel reflector may be positioned behind a second major surface of the light guide panel opposite said first major surface, wherein at least part of said first major surface forms the aforementioned light outcoupling surface of the light guide panel.

The light guide panel may comprise light out-coupling features arranged on at least one major surface of the light guide panel, e.g. the aforementioned first major surface of the light guide panel. The light out-coupling features may include at least one of structures, roughness, or similar.

The plurality of first light sources and the at least one second light source may be LED (light emitting diode) light sources. The first light sources adapted to emit visible light and in case they emit white light they could be phosphor converted blue LEDs or RGB LEDs. The first light sources could be devoid of optics. The first light sources may be placed fairly close to their light incoupling part of the light guide panel (e.g. approx. 1 mm).

According to a second aspect of the invention, there is provided a luminaire or lamp comprising a lighting device according to the first aspect. The luminaire may for example be a ceiling luminaire for general lighting or a wall luminaire for general lighting. The lamp may for example be a standing lamp or a table lamp.

It is noted that the invention relates to all possible combinations of features recited in the claims.

BRIEF DESCRIPTION OF THE DRAWINGS

This and other aspects of the present invention will now be described in more detail, with reference to the appended drawings showing embodiments of the invention.

As illustrated in the figures, the sizes of layers and regions may be exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
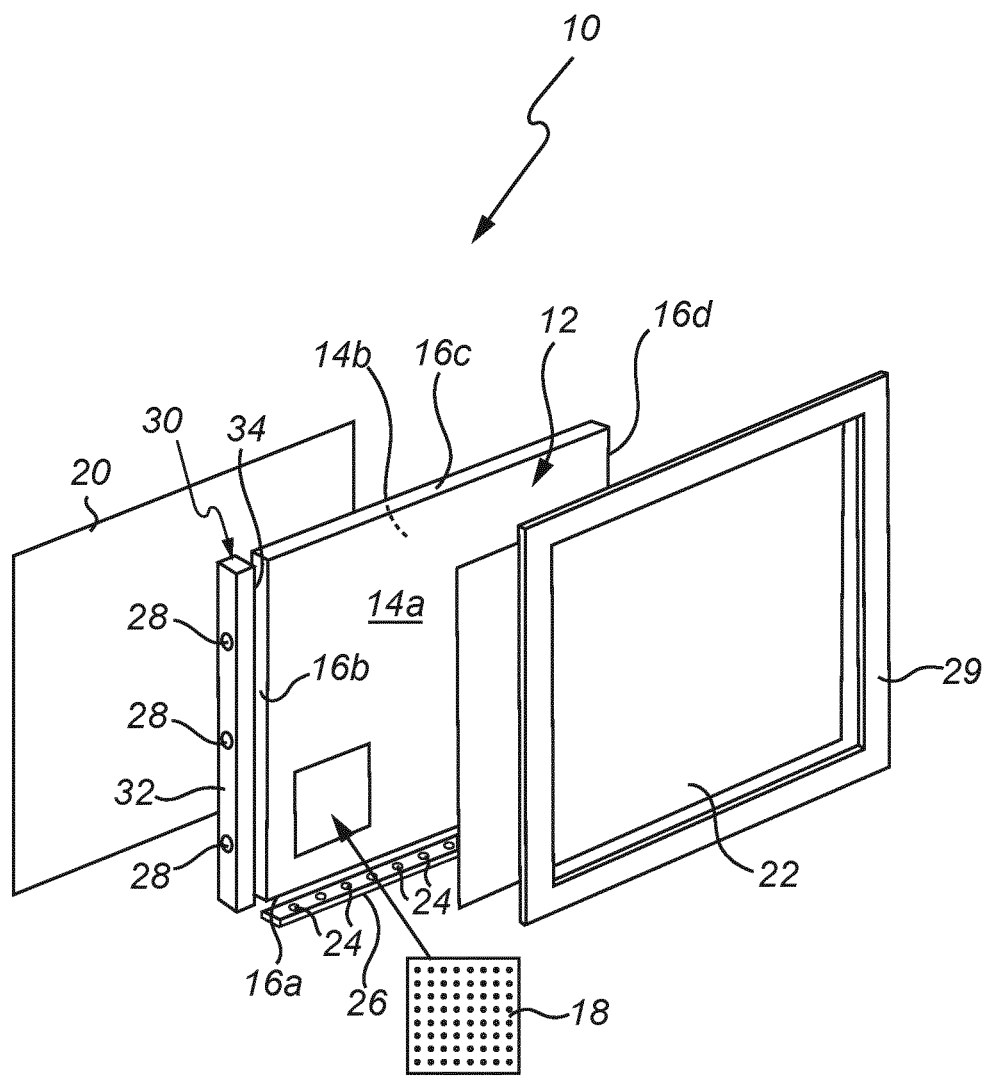
FIG. 1 is an exploded perspective view of a lighting device according to an embodiment of the present invention.
Figure 2:
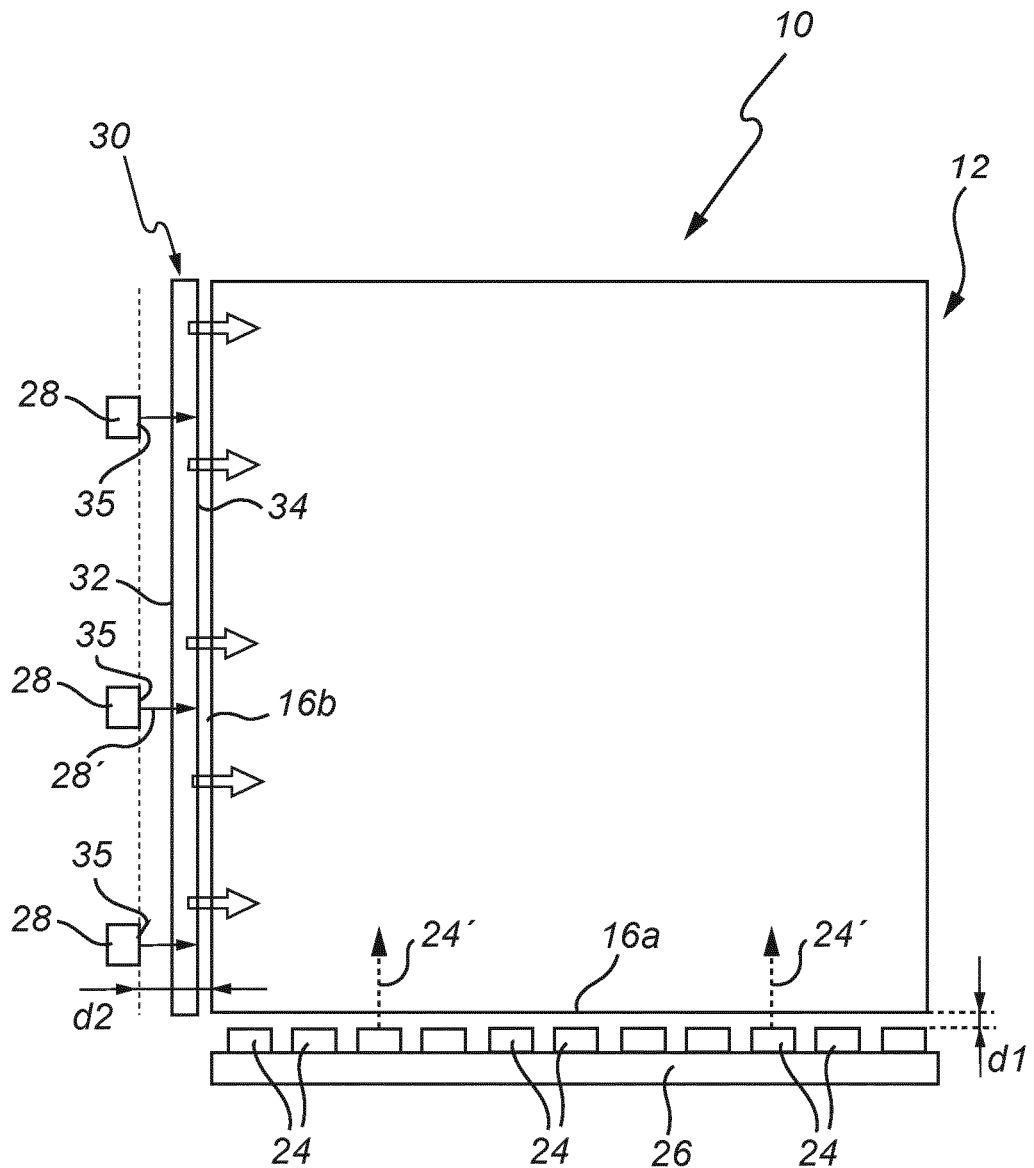
FIG. 2 is a schematic front view of the lighting device of FIG. 2.

FIGS. 1-2 show a lighting device 10 according to one or more embodiments of the present invention.

The lighting device 10 comprises a light guide panel (LGP) 12. It should be noted that within the context of the application the term "light guide panel" may be any panel, object, plate, slab or similar suitable for serving as light guide. In other words, any panel, object, plate, slab or similar suitable for conducting light may be used. The light guide panel 12 may be made of a transparent, semi-transparent or translucent material to give a few examples. The light guide panel 12 may for example be made of plastics (polymer).

Figure 3:
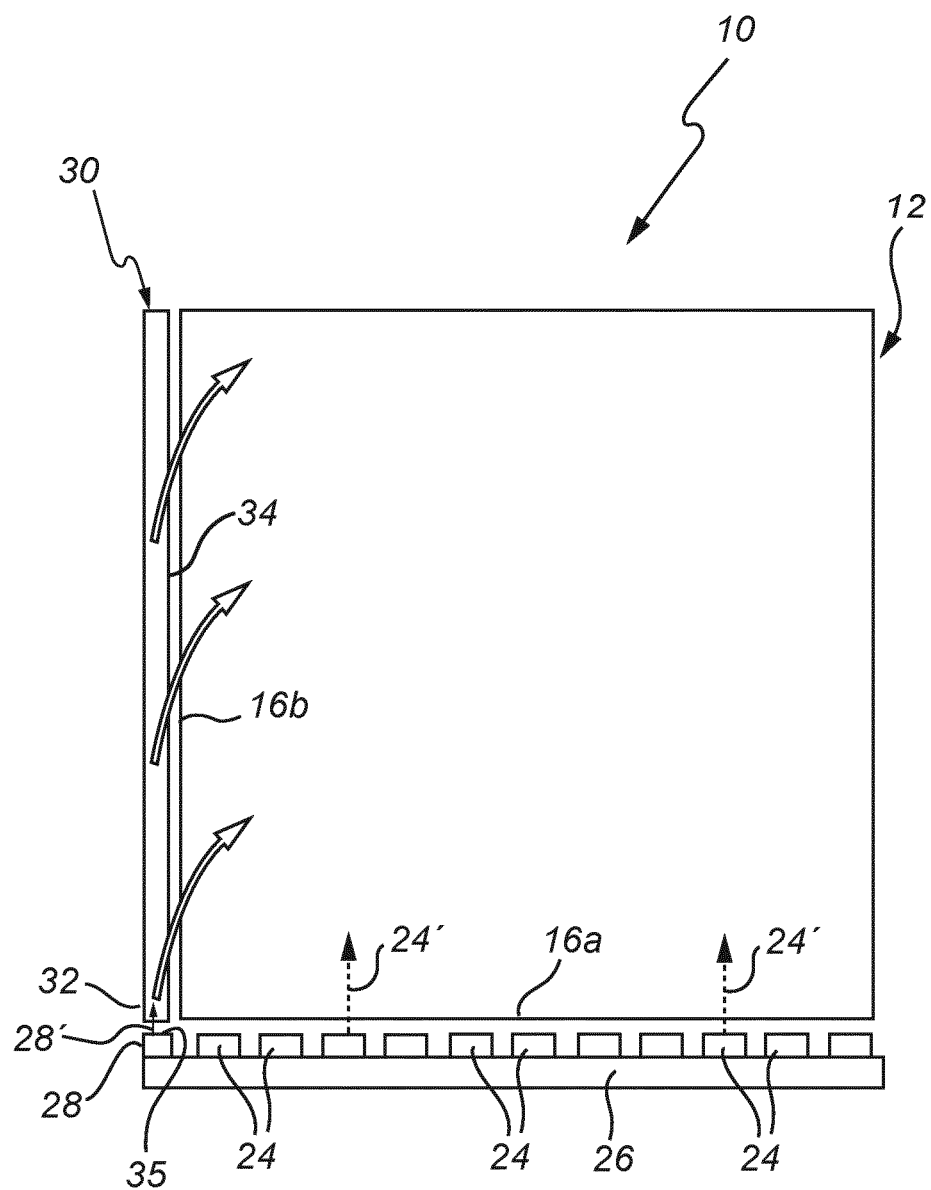
FIG. 3 is a schematic front view of a variant of the present lighting device.

The light guide panel 12 in FIGS. 1-3 is a (flat) plate. The light guide panel 12 in FIGS. 1-3 is rectangular. However, it could have other shapes, like square, circular, hexagonal, orthogonal, etc. The light guide panel 12 may have a length L, a width W, and a thickness T. Typically, L>20 T and W>20 T. For example, L=10 cm, W=10 cm, and T=0.5 cm, for a square light guide panel. The light guide panel 12 has a first major (front) surface 14a, and a second major (back) surface 14b opposite the first major surface 14a. The light guide panel 12 further has four edges (or side surfaces) 16a-d. The edges 16a-d connect the first and second major surfaces 14a-b. The first major surface 14a may form a light outcoupling surface of the light guide panel 12. At least one of the edges 16a-d may form at least one light incoupling part of the light guide panel 12.

The light guide panel 12 may advantageously be provided with light out-coupling features 18 arranged on the first major surface 14a. The light out-coupling features 18 may include at least one of structures, roughness, or similar. Furthermore, the light guide panel 12 may be arranged between a (light guide panel) reflector 20 and a diffuser 22. The diffuser 22 may be positioned in front of the first major surface 14a, and the reflector 20 may be positioned behind the second major surface 14b, as illustrated in FIG. 1. The diffuser 22 may reduce glare. The diffuser 22 may for example be a diffuser film or a diffuser plate. The reflector 20 may for example be a reflexive coating, such as a metal coating, provided on the second major surface 14b.

The lighting device 10 further comprises a plurality of first light sources 24 adapted to emit visible light 24'. The lighting device 10 may for example comprise ten first light sources 24. The first light sources 24 may for example be phosphor converted blue LEDs. Alternatively, they could be RGB LEDs. The plurality of first light sources 24 are in FIGS. 1-2 arranged in one line along (substantially) the complete length of one edge of the edges 16a-d of the light guide panel 12, namely edge 16a. Edge 16a, which is the nearest light guide panel edge for the first light sources 24, forms a light incoupling part for the first light sources 24. A (nearest) distance from the plurality of first light sources 24 to their light incoupling part 16a is designated by d1. The first light sources 24 may be mounted on a strip substrate 26. The strip substrate 26 is parallel to the edge 16a.

In operation of the lighting device 10, visible light 24' emitted by the plurality of first light sources 24 is coupled into the light guide panel 12 via the light incoupling part 16a, wherein at least part of the visible light that is coupled into the light guide panel 12 is guided via total internal reflection within the light guide panel 12, and wherein at least part of the visible light that is guided within the light guide panel 12 is coupled out of the light guide panel 12 at the light outcoupling surface 14a.

The lighting device 10 further comprises at least one second light source 28 adapted to emit one of UV light 28' and violet light. The number of second light sources 28 is typically smaller than the number of first light sources 24. The at least one second light source 28 may be LED light sources, for example one or more UV LEDs. The UV light may be in the wavelength range of 10 nm to 400 nm. The violet light may be in the wavelength range of 380 nm to 420 nm or 380 nm to 410 nm. Violet kills bacteria, in particular at 405 nm. The at least one second light source 28 may specifically be adapted to emit at least one of UV-C (100-280 nm), UV-B (280-315 nm), and UV-A (315-380 nm) radiation. UV-A kills bacteria. UV-B kills bacteria and slightly kills (some) viruses. UV-C kills bacteria and kills viruses.

The UV light 28' and/or violet light is to be coupled into the light guide panel 12 via a light incoupling part for the at least one second light source 28, here edge 16b, which is the nearest light guide panel edge for the at least one second light source 28. A (nearest) distance from the at least one second light source 28 to its light incoupling part 16b is designated by d2.

The at least one second light source 28 may be positioned further from its light incoupling part 16b than the plurality of first light sources 24 are positioned from their light incoupling part 16a. In other words, d2>d1. d2 may be at least two (or three) times greater than d1. d1 is typically <4 mm, more preferably <3 mm, most preferably 1-2 mm. d2 is preferably >5 mm, more preferably >7 mm, most preferably >9 mm.

By placing the at least one second light source 28 further from its nearest light incoupling part 16b of the light guide panel 12 than the plurality of first light sources 24, the local UV/violet intensity on the light guide panel 12 may be lowered (while the first light sources 24 still can be closely positioned to their light incoupling part 16a), whereby local material degradation of the light guide panel 12 may be prevented, which in turn means that the lifetime of the light guide panel 12 may be improved.

The lighting device 10 may further comprise a (here rectangular) frame 29 surrounding the light guide panel 12. The frame 29 may fix the light guide panel 12, reflector 20, and diffuser 22. The frame 29 is adapted to shielding the plurality of first light sources 24 and the at least one second light source 28. The frame 29 may also shield other components of the lighting device 10, such as electronics, a heatsink, etc (not shown).

According to the present invention, the lighting device 10 further comprises an optical element 30. In FIGS. 1-2, the optical element 30 is a second light guide. This light guide is denoted 'second' not to confuse it with the (first) light guide (panel) 12. The optical element/second light guide 30 may be shielded by the aforementioned frame 29, such that it is not visible from the outside when someone is observing the lighting device 10.

The optical element 30 is made of a first material which is different and more UV resistant than a second material that the light guide panel 12 is made of The first material may be glass or UV fused silica or high purity silica or silicone, for example. The second material may for example be plastics (polymer), as indicated above.

The optical element 30 in FIGS. 1-2 extends along substantially the complete length of edge 16b of the light guide panel 12. Hence, the length of the optical element 30 is (substantially) equal to that of the edge 16b. Furthermore, the thickness t of the optical element 30 may be equal to or (slightly) less than the distance d2. The optical element/second light guide 30 in FIGS. 1-2 may for example be a rod with a rectangular or square cross-section.

Furthermore, the optical element 30 comprises a second light incoupling part 32 and a second light outcoupling surface 34. The light incoupling part 32 and the light outcoupling surface 34 are denoted 'second' not to confuse them with the (first) light incoupling parts 16a-b and the (first) light outcoupling surface 14a of the light guide panel 12. In FIGS. 1-2, the second light outcoupling surface 34 faces the edge 16b of the light guide panel 12, whereas the second light incoupling part 32 is opposite the second light outcoupling surface 34.

Furthermore in FIGS. 1-2, the at least one second light source 28 is a plurality of second light sources 28 adapted to emit UV light 28' and/or violet light, for example three second light sources 28. The plurality of second light sources 28 are distributed along the second light incoupling part 32 of the optical element 30.

In operation, light emitted by the second light sources 28, such as UV light 28', is coupled into the optical element 30 via its second light incoupling part 32, wherein at least part of the light that is coupled into the optical element 30 is guided within the optical element 30, wherein at least part of the light that is guided within the optical element 30 is coupled out of the optical element 30 at the second light outcoupling surface 34, and wherein at least part of the light that is coupled out of the optical element 30 at the second light outcoupling surface 34 is coupled into the light guide panel 12 via the edge 16b.

By means of the optical element 30, the UV/violet light 28' is distributed over an area (corresponding to that of the second light outcoupling surface 34), which area is much larger than the total light output surface area 35 of the at least one second light source 28, before the UV/violet light is coupled into the light guide panel 12. In this way, local material degradation such as browning of the (polymer) light guide panel 12 is prevented, whereby the lifetime of the present lighting device 10 may be improved.

The UV/violet light 28' may, by means of the optical element 30, be distributed over an area (corresponding e.g. to that of the second light outcoupling surface 34) which is preferably at least 4 times larger, more preferably at least 8 times larger, most preferably at least 10 times larger, such as for example 20 times larger, than the total light output surface area 35. The light output surface area 35 of each second light source 28 may for example be about 1 mm×1 mm. The total light output surface area of say three second light sources 28 would then be 3×0.01 cm 2=0.03 cm². The total light output surface area of a single second light source 28, like for example in FIG. 3, would be 0.01 cm².

In a variant of the lighting device 10 of FIGS. 1-2, which variant is shown in FIG. 3, the at least one second light source 28, which here may be a single second light sources 28 adapted to emit UV light 28' and/or violet light, is positioned at a short(er) end of the optical element/second light guide 30, which short(er) end here constitutes the second light incoupling part 32 of the optical element 30. The second light source 28 may here conveniently be mounted on the same strip substrate 26 as the plurality of first light sources 24.

Figure 4:
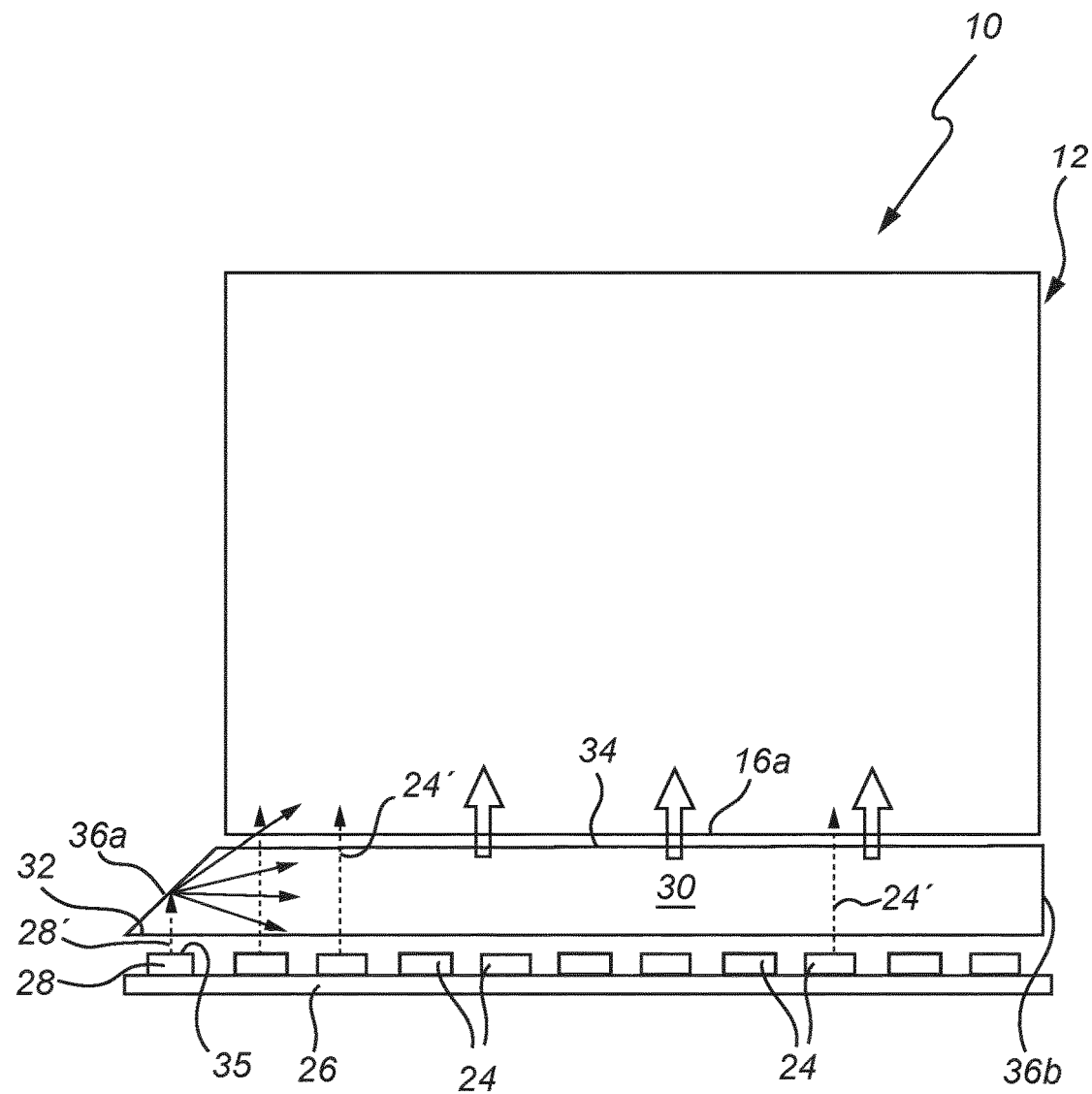
FIG. 4 is a schematic front view of another variant of the present lighting device.
Figures 5A, 5B, 5C:
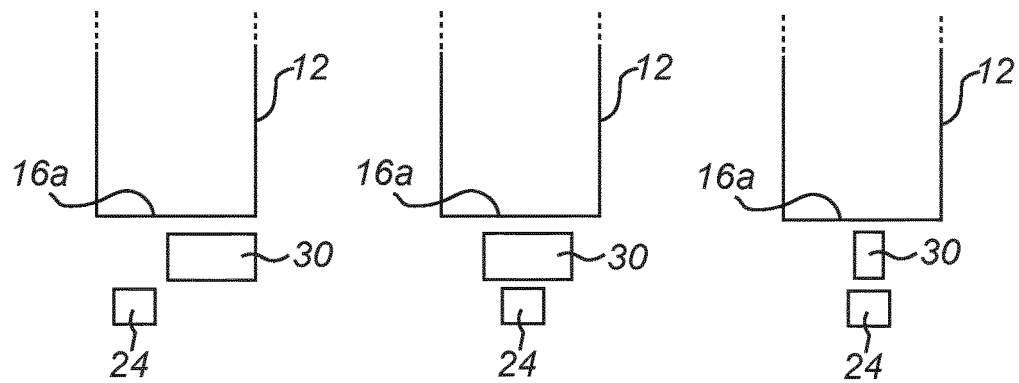
FIGS. 5*a-c* show partial side views of sub-variants of the lighting device in FIG. 4.

In another variant shown in FIG. 4, the optical element/second light guide 30 may be arranged along the same edge 16a of the light guide panel 12 as the plurality of first light sources 24. In FIG. 4, the second light outcoupling surface 34 of the optical element 30 faces the edge 16a of the light guide panel 12. Furthermore, the optical element 30 here extends beyond the edge 16a and over the (at least) one second light source 28, which second light source 28 may be mounted next to the plurality of first light sources 24, preferably on strip substrate 26. Also in FIG. 4, the second light incoupling part 32 may be formed by a surface portion of the optical element 30, which surface portion extends beyond the edge 16a and faces the second light source 28. Furthermore, the end 36a of the optical element 30 that is situated beyond the edge 16a may be oblique, such that (e.g.) UV light 28' may be reflected towards the opposite end 36b of the optical element 30. Furthermore, optical element 30 may here be arranged not in the optical path of the visible light 18' (FIG. 5a), fully in the optical path of the visible light 18' (FIG. 5b), or partly in the optical path of the visible light 18' (FIG. 5c).

Figure 6:
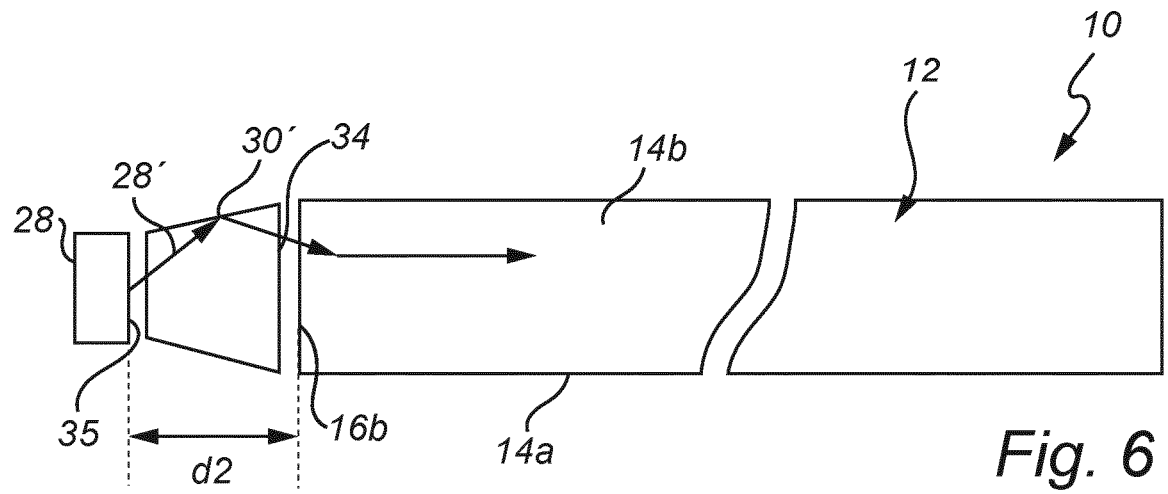
FIG. 6 is a schematic top view of yet another variant of the present lighting device.
Figure 8:
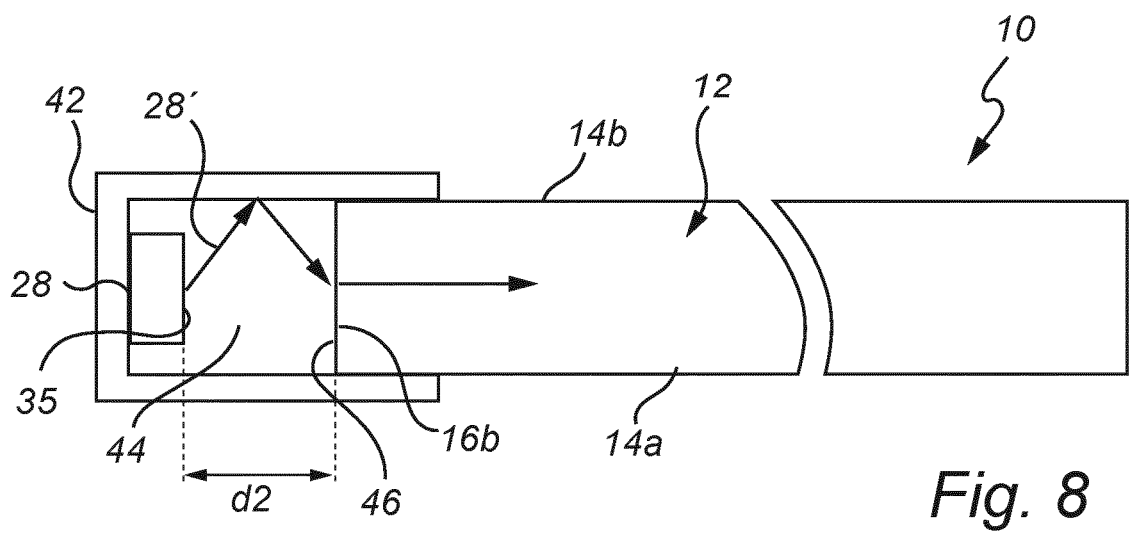
FIG. 8 is a schematic top view of a lighting device according to another embodiment of the present invention.

In yet another variant of the lighting device 10 of FIGS. 1-2, which variant is shown in FIG. 6, the optical element is a TIR collimator 30'. The TIR collimator 30' may be a rod with a TIR collimator cross-section serving several (all) second light sources 28. Alternatively, the optical element may be multiple TIR collimators, one per second light source 28. In any case, the area of a second light outcoupling surface 34 of the TIR collimator (rod) 30' or the TIR collimators is greater than the total light output surface area of the at least one second light source 28, in particular in the former case. Various TIR collimator cross-sections that could be used in the present invention are per se known to the skilled person.

Figure 7A:
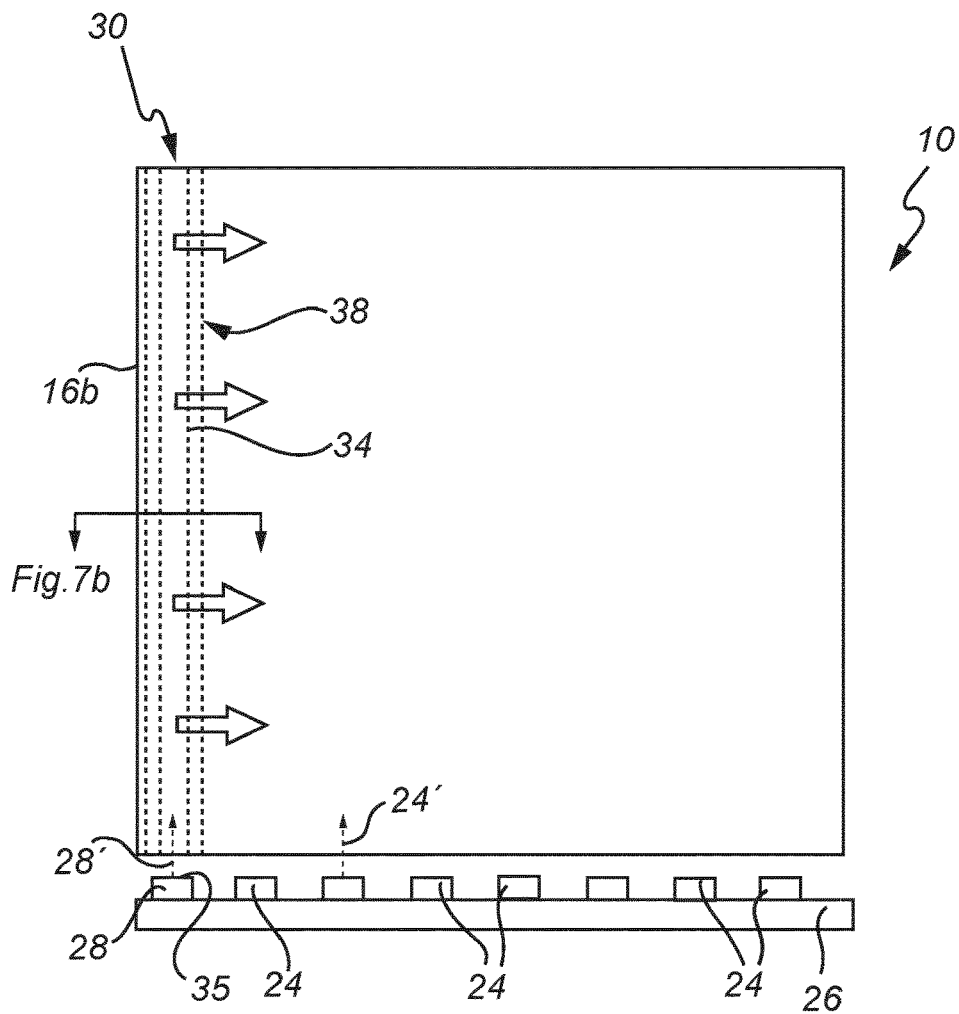
FIGS. 7*a-b* schematically illustrate a lighting device comprising an optical fiber.
Figure 7B:
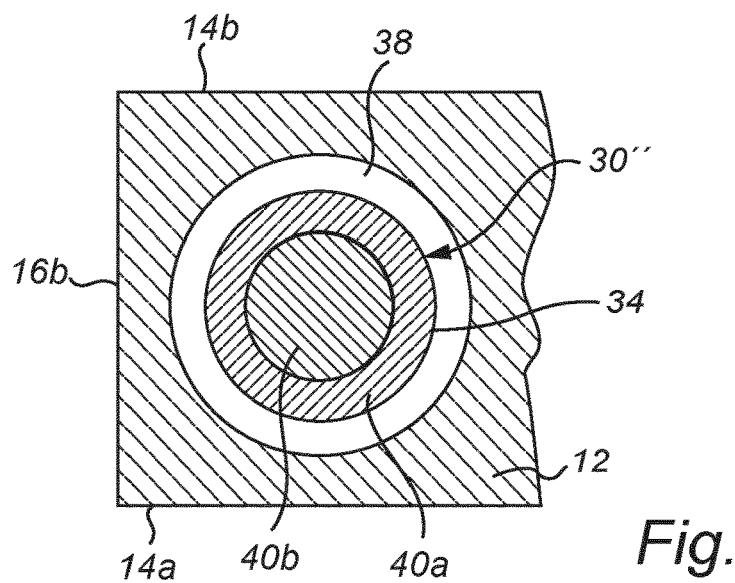

In still another variant shown in FIGS. 7a-b, the optical element may be an optical fiber 30". The optical fiber/optical element 30" may for example run through a hole 38 in the light guide panel 12, wherein the inside of the hole 38 forms a light incoupling part of the light guide panel 12 for the at least one second light source 28. The hole 38 may for example extend along the edge 16b of the light guide panel 12. The optical fiber 30" may be a "leaky" optical fiber, with a cladding 40a next to a core 40b, wherein the cladding 40a preferably has a lower refraction index than the core 40b. The cylindrical outer surface of the optical fiber 30" forms a second light outcoupling surface 34, the area of which is (much) larger than the total light output surface area 35.

In another embodiment similar to e.g. that of FIGS. 1-2, the optical element is a reflector 42. The reflector 42 may for example be made of (UV resistant) metal or alloy. The reflector 42 may for example extend along substantially the complete length of the edge 16b of the light guide panel 12. The reflector 42 may conveniently be formed by a part (e.g. one side) of the aforementioned frame 29. The reflector 42 at least partly defines a space 44. To this end, the reflector 42 may have a U-shaped or Π-shaped cross-section, for example. The at least one second light source 28 may be arranged at or near the bottom of the (U-shaped or Π-shaped) reflector 42. A light exit window 46 may face the edge 16b (=light incoupling part for the at least one second light source 28) of the light guide panel 12. In operation, the space 44 acts as a (light) mixing chamber for light 28' emitted by the at least one second light source 28 before light (typically source light+mixed light) from the mixing chamber is coupled into the light guide panel 12. The area of the light exit window 46 may be (much) larger than the total light output surface area 35 of the at least one second light source 28. By means of the reflector 42, the UV/violet light 28' may be distributed over a larger area before the UV/violet light 28' is coupled into the light guide panel 12, without making the lighting device 10 unduly large.

The present lighting device 10 may for example be, or be included in, a luminaire, for example a ceiling luminaire for general lighting, a wall luminaire for general lighting, etc. The lighting device could alternatively be included in a lamp, such as a standing lamp, a table lamp, etc.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A lighting device, comprising:
   a plurality of first light sources adapted to emit visible light;
   a light guide panel comprising at least one first light incoupling part positioned at an edge or edge portion and a light outcoupling surface, wherein the lighting device is arranged such that visible light emitted by the plurality of first light sources in operation is coupled into the light guide panel via one of said at least one first light incoupling part, wherein at least part of the visible light that is coupled into the light guide panel is guided by the light guide panel, and wherein at least part of the visible light that is guided by the light guide panel is coupled out of the light guide panel at the light outcoupling surface;
   at least one second light source adapted to emit at least one of UV light and violet light; and
   an optical element made of a first material which is different and more UV resistant than a second material that the light guide panel is made of, the optical element being a second light guide extending along an edge or edge portion of the light panel, comprises a second light incoupling part and a second light outcoupling surface, wherein the lighting device is arranged such that light emitted by the at least one second light source in operation is coupled into the optical element via the second light incoupling part, the at least one second light source is positioned further from the second light incoupling part of the at least one second light source than the plurality of first light sources are positioned from one of said at least one first light incoupling part, at least part of the light that is coupled into the optical element is guided by the optical element, at least part of the light that is guided by the optical element is coupled out of the optical element at the second light outcoupling surface, the optical element is adapted to distribute light emitted by the at least one second light source over an area which is larger than a total light output surface area of the at least one second light source before the light is coupled into the light guide plate, and at least part of the light that is coupled out of the optical element at the second light outcoupling surface is coupled into the light guide panel via one of said at least one first light incoupling part.

2. A lighting device according to claim 1, wherein a nearest distance from the at least one second light source to the corresponding second light incoupling part is at least two times greater than a nearest distance (d1) from the plurality of first light sources to the corresponding second light incoupling part.

3. A lighting device according to claim 1, wherein the plurality of first light sources light are arranged along a different edge or edge portion of the light guide panel than said optical element.

4. A lighting device according to claim 1, wherein said optical element is a reflector at least partly defining a space in operation acting as a mixing chamber for light emitted by the at least one second light source before light from the mixing chamber is coupled into the light guide panel.

5. A lighting device according to claim 1, further comprising a frame surrounding the light guide panel, wherein said optical element is arranged in the frame, the frame shielding the plurality of first light sources, the at least one second light source, and the optical element.

6. A lighting device according to claim 1, wherein said optical element is embedded in the light guide panel or integrated with the light guide panel or arranged behind the light guide panel or arranged in front of the light guide panel.

7. A lighting device according to claim 6, wherein said optical element is arranged as an optical fiber.

8. A lighting device according to claim 1, wherein said first material is an organic material, for example selected from the group comprising: glass, UV fused silica, high purity silica, and silicone.

9. A lighting device according to claim 1, wherein the light guide panel is arranged between a light guide panel reflector and a diffuser of the lighting device.

10. A lighting device according to claim 1, wherein the light guide panel comprises light out-coupling features arranged on at least one major surface of the light guide panel.

11. A luminaire or lamp comprising a lighting device according to claim 1.

* * * * *